United States Patent
Dayton et al.

(10) Patent No.: US 7,742,883 B2
(45) Date of Patent: Jun. 22, 2010

(54) FAUCET FLOW TIMING SYSTEM THAT MONITORS VOLUME OF WATER USAGE

(75) Inventors: Douglas C. Dayton, Harvard, MA (US); Sung Park, Newton, MA (US); Mark R Florence, Newton, MA (US)

(73) Assignee: Umagination Labs, L.P., Newton, MA (US)

( * ) Notice: Subject to any disclaimer, the term of this patent is extended or adjusted under 35 U.S.C. 154(b) by 118 days.

(21) Appl. No.: 12/054,558

(22) Filed: Mar. 25, 2008

(65) Prior Publication Data

US 2008/0262755 A1 Oct. 23, 2008

Related U.S. Application Data

(60) Provisional application No. 60/979,809, filed on Oct. 13, 2007, provisional application No. 60/920,978, filed on Mar. 30, 2007.

(51) Int. Cl.
*G01F 1/00* (2006.01)

(52) U.S. Cl. .................. 702/45; 73/273; 236/12.1; 236/12.12; 702/100

(58) Field of Classification Search .................. 702/45, 702/46, 50, 100; 236/12.1, 12.12; 239/72; 73/273; 700/32
See application file for complete search history.

(56) References Cited

U.S. PATENT DOCUMENTS

| 4,854,498 | A | 8/1989 | Stayton |
| 4,923,116 | A | 5/1990 | Homan |
| 5,979,776 | A | 11/1999 | Williams |
| 6,029,094 | A | 2/2000 | Diffut |
| 2007/0152074 | A1* | 7/2007 | Stowe et al. ............ 236/12.1 |

OTHER PUBLICATIONS

English, Simon "Smart Water Fund Development and Trial of Smart Shower Meter Demonstration Prototypes", http://www.smartwater.com.au/projectdocs/project36/Smart%20Shower%20Meter%20Project%20Report.pdf, (Feb. 21, 2006),1-23.

* cited by examiner

*Primary Examiner*—John H Le
(74) *Attorney, Agent, or Firm*—Strategic Patents, P.C.

(57) ABSTRACT

A battery powered, low voltage faucet flow timer, water usage calculator, and energy consumption awareness meter is simple to install and calibrate and may enable a user to understand the water usage associated with showering, bathing or other open faucet water use activity. The device may provide a simple method for calculating the flow characteristics for a shower, bath or other faucet and entering this flow rate into the timing device so that the timer provides an accurate calculation of water usage indicating both the time spent with the water running and approximate total water usage.

12 Claims, 4 Drawing Sheets

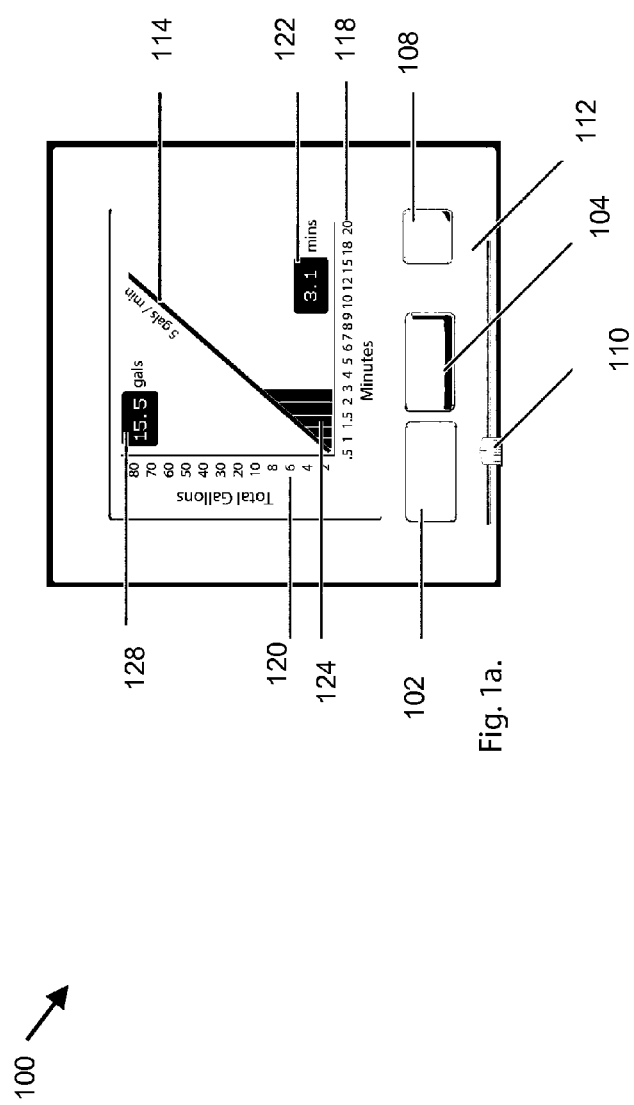
Fig. 1a.
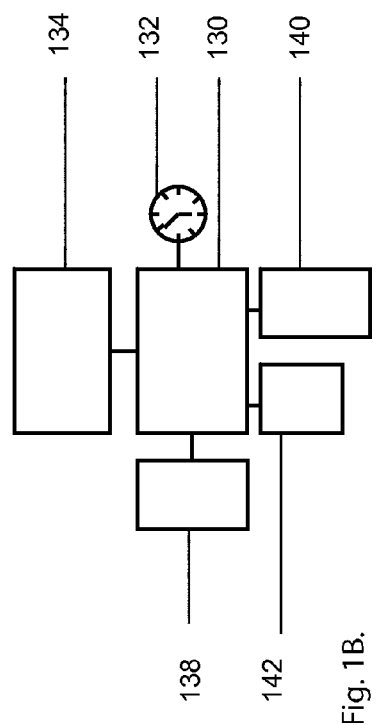
Fig. 1B.
Fig. 1

FAUCET FLOW TIMING SYSTEM THAT MONITORS VOLUME OF WATER USAGE

CROSS-REFERENCE TO RELATED APPLICATIONS

This application claims the benefit of the following provisional applications, each of which is hereby incorporated by reference in its entirety: U.S. Provisional Application No. 60/920,978, filed Mar. 30, 2007; and U.S. Provisional Application No. 60/979,809, filed Oct. 13, 2007.

BACKGROUND

1. Field

The present invention relates to an energy consumption awareness and flow meter.

2. Description of the Related Art

As the world human population grows and our global civilization becomes ever more industrialized, the fresh water supply of planet Earth is coming under increasing pressures. In some areas, such as California and the South West of the United States, the needs of the burgeoning population require importing water from great distances to meet the demand. As these pressures on the water supply continue to grow, the cost of water is destined to increase dramatically. Many people already feel the pinch. It is generally understood that basic conservation measures constitute the best first step to improving the pressures on the water supply and to alleviating the increasing personal costs associated with water usage. As with many conservation efforts, education and information are the foundation to a successful implementation. The invention provides a device and methods of improving awareness, such as within a household or a business, of water consumed through, for instance, bathing and showering, and encourages conservation by providing information related to the duration of water use and the total water consumed.

SUMMARY

In an aspect of the invention, a method of calculating an attribute of water usage with a water usage meter may comprise determining a flow rate of a household faucet as an interval of time over which an amount of water is consumed, measuring a water consumption time interval during a water consuming activity at the household faucet, calculating a volume of water consumed using the flow rate and the water consumption time interval, and calculating potential water savings if at least one of the flow rate and the water consumption time interval were to be adjusted. In the method, determining the flow rate may include actuating a start button of the calibration system of a water usage meter to commence timing and a stop button to terminate timing. The method may further include disposing a selector switch on the water usage meter to indicate the flow rate. The method may further include automatically starting and stopping the timer when the acoustic signature of running water is detected by an audio recognition system of the water usage meter. The method may further include displaying calculated water usage statistics. The statistics may be at least one of a total time of water usage, an amount of water consumed, a cost of water consumed, a cost of energy consumed, an amount of energy consumed, an aggregate water usage and water consumption trends. The amount of water consumed, a water temperature and an energy delivery cost may be used to calculate potential cost savings if at least one of the water temperature and water consumption were to be adjusted. The amount of water consumed and a water delivery cost may be used to calculate potential cost savings if the water consumption were to be adjusted. The method may further include integrating at least one of an AM/FM or satellite radio, a CD player, an MP3 player, a mirror, a hook, a soap dish, a device holder, a thermometer, a clock, and a dispenser with the water usage meter. In the method, power for the water usage meter may be provided by a battery. In the method, the water usage meter may be water resistant.

In an aspect of the invention, a water usage meter may comprise a measurement system to measure a flow rate of a household faucet as an interval of time over which a defined amount of water is consumed, a timer to measure a water consumption time interval during a water consuming activity at the household faucet, and a calculator to calculate a volume of water consumed using the flow rate, the water consumption interval, and a potential water savings if at least one of the flow rate and the water consumption time interval were to be adjusted. The meter may further include a start button of the calibration system to commence timing and a stop button to terminate timing. The meter may further include a selector switch disposed on the meter to indicate the flow rate. The meter may further include an audio recognition system for automatically starting and stopping the timer when the acoustic signature of running water is detected. The meter may further include a display to display water usage statistics. The statistics may be at least one of a total time of water usage, an amount of water consumed, a cost of water consumed, a cost of energy consumed, an amount of energy consumed, an aggregate water usage and water consumption trends. In the meter, the attribute may be an amount of water consumed. The calculator may use the amount of water consumed, a water temperature and an energy delivery cost to calculate potential cost savings if at least one of the water temperature and the water consumption were to be adjusted. The calculator may use the amount of water consumed and a water delivery cost to calculate potential cost savings if the water consumption were to be adjusted. The meter may further include at least one of an integrated AM/FM or satellite radio, an integrated CD player, an integrated MP3 player, a mirror, a hook, a soap dish, a device holder, a thermometer, a clock, and a dispenser. In the meter, power for the water usage meter may be provided by a battery. In the meter, the water usage meter may be water resistant.

In an aspect of the invention, a system and method of conserving water during a water consuming activity monitored by a water usage meter may comprise collecting water consumption information for a particular water supply over a period of time, calculating if more or less water was consumed during the water consuming activity relative to a programmed value of water consumption, and calculating and storing a water consumption credit if less water was consumed than a programmed value or calculating and storing a water consumption debt if more water was consumed than a programmed value. The system and method may further comprise applying a water consumption credit to the calculation of the volume of water usage for one or more future water-consuming activities. The water consuming activity may be automatically terminated when the calculated volume of water usage is reached. The system and method may further comprise applying a water consumption debt to the calculation of the volume of water usage for one or more future water-consuming activities. The water consuming activity may be automatically terminated when the calculated volume of water usage is reached.

In an aspect of the invention, a system and method of conserving water during a water consuming activity monitored by a water usage meter may comprise collecting water consumption information for a particular water supply over a period of time, calculating whether more or less water was consumed during the water consuming activity relative to a programmed value of water consumption, calculating and storing a water consumption credit if less water was consumed than a programmed value, or calculating and storing a water consumption debit if more water was consumed than a programmed value, and applying the water consumption credit or debit to the calculation of a volume of water allocated for one or more future water-consuming activities. In the system and method, the water consuming activity may be automatically terminated when the allocated volume of water usage is reached.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 1A and 1B are schematic diagrams of one embodiment of an integrated water flow timer and water usage calculator device according to the invention;

DETAILED DESCRIPTION

Figure 2:
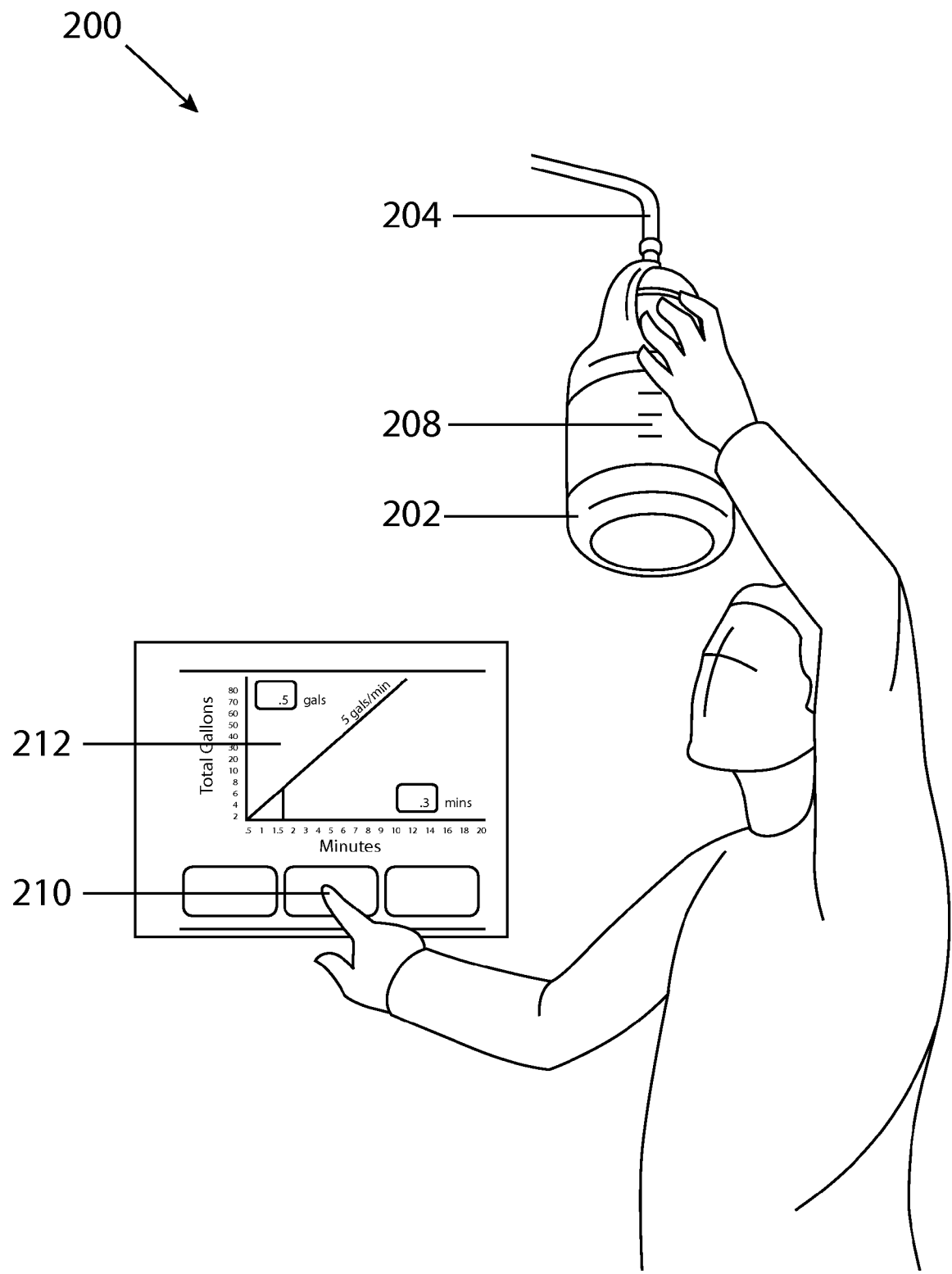
FIG. 2 is a perspective view illustrating a method of calibrating the device shown in FIGS. 1A and 1B.

A low voltage integrated water flow timer and water usage calculator device is provided that is configured for easy calibration and installation near or proximate a water faucet or other water outlet. The water flow timer/usage calculator may provide information related to water used during showering, bathing and any of a variety of activities during which water is used and consumed. In addition, the water flow timer/usage calculator enables a simple method for calculating the flow characteristics of a faucet, e.g., of a shower, a bath or a garden hose, and for entering the particular flow rate of the faucet into the flow timer/usage calculator in order for the flow timer/usage calculator to determine an accurate calculation of water usage, indicating both the time the faucet is running and the approximate total volume of water consumed. The invention helps to provide users of the device with an understanding of their water usage for particular activities and thereby helps to motivate users to practice water conservation.

Referring to FIG. 1A, the invention provides an integrated water flow timer and water usage calculator device including a water-resistant housing, a START key/button, a STOP key/button, a RESET key/button, a display and associated electronics contained within the housing. The START key/button, the STOP key/button, the RESET key/button, and the display are each operatively coupled with the associated electronics in order to perform the functions described below. The device may be configured to determine and to display the duration of water usage for a given activity during which water is used or consumed and to calculate a volume of water used during the activity. In FIG. 1A, the display of the device shows both the duration of water usage and the calculated volume of water used. The device may operate like a stop watch with a START key 102 that the user may actuate as the water is turned on and a STOP key 104 that is actuated manually or when the faucet is turned off. The display, such as an LCD display, may display information related to the duration of water usage for a given activity and the total volume of water consumed during the activity. The information on the display may remain until the display is cleared with the RESET button 108. Alternatively, or additionally, the device may include a touch screen panel (not shown) or other touch screen configuration or display incorporated with and displayed along the display, and/or disposed below the display along the housing, including the START key/button, STOP key/button, and RESET key/button, such that, a user may actuate, such as manually depress, any of the touch screen keys/buttons to actuate the START, STOP and RESET functions or operations, as well as the functions or operations of the switches.

When the device is first installed, calibration may be necessary for a particular water faucet. It may be necessary to enter the timed interval for faucet delivery of an amount of water, such as one gallon or other increment of water, to establish a flow rate by which can be calculated the actual water volume usage. The time required for delivery is set on the device using a selector switch 110 with a time scale 112 which can be of many types, such as slider (illustrated), rotary, dip switch, and the like and thereafter may provide the computational constant that the device may use to calculate the amount of water consumed during the timed interval.

Alternatively, calibration may be done automatically using a CALIBRATION key on the device. In calibration mode, the actuation of the START key 102 as filling of a calibration vessel commences and the actuation of the STOP key 104 when the calibration volume is achieved may automatically enter the flow rate of the supply or faucet into the device memory.

During use of the device, when the device is selected for use mode, the device calculates a water consumption rate of a water use activity. The calculation of consumption rate may be displayed as a trend line 114, a bar graph, a scatter plot, or the like on the display, relating time in hours, minutes, seconds, or the like on the x-axis 118 to amount of water consumed (in units that may be selectable by the user) on the y-axis 120. In an alternative embodiment, time is displayed on the y-axis 120 while amount of water consumed is displayed on the x-axis 118. As the timer counts the time interval during a shower or other water usage, much like a timer or real-time clock, the elapsed time may be shown 122 in minutes and tenths (or minutes and seconds, or any other meaningful time interval) on the display. At the same time, the area under the trend line 114 may be filled in graphically 124 as time progresses to further provide a visual indication of a volume of water being consumed or consumer during the activity. The number of gallons (or other meaningful measure of water volume) can be read off of the y-axis 120. In an alternative embodiment, the incrementing number of units of water used may be shown independently as a number 128, such as an Arabic number or Roman numeral, of gallons and tenths (or any other unit of water volume measure) being consumed or consumed on the display.

Referring to FIG. 1B, a schematic diagram illustrates the associated functional electronics of the device contained in the housing. The functional electronic elements of the device may include a CPU 130 with a clock 132 and memory 134, a power supply 138 which may be a battery with appropriate signal conditioning, a line power supply, and the like, an output display 140, and a variety of input keys 142 or switches and associated electronics operatively coupled to a multiple of input keys/buttons, such as those described above. As shown in FIG. 1B, the CPU may be operatively coupled with each of the other functional electronics. The switches and/or associated electronics may actuate functions or operations of the device. In one embodiment the switches may be actuated via the START key/button, STOP key/button, and RESET key/button. Alternatively, or additionally, the device may include a touch screen panel (not shown) or other touch screen configuration or display incorporated with and displayed along the display, and/or disposed below the display along the housing, which displays the START key/button, STOP key/button, and RESET key/button, such that, a user may actuate, such as manually depress, any of the touch screen keys/buttons to actuate the START, STOP and RESET functions or operations, as well as the functions or operations of the switches.

Referring to FIG. 2, the low voltage flow timer, water usage calculator, and energy consumption awareness meter may be water resistant and simple to install, mounting to the wall of the bathroom or other area, proximate to a water supply or faucet, via a mechanical or adhesive means, such as a peel off protective backing that exposes an adhesive surface, a suction cup, and the like. When first installed, the device may be calibrated to determine a computational constant of the water supply or faucet that the device is associated with in order for the device to accurately calculate the actual flow rate of water from the supply or faucet. The timed interval for faucet delivery of one gallon (or other increment) of water may be entered into the device to establish a flow rate or a computation constant by which can be calculated the actual water volume consumption during normal use. The device may use the computational constant of that particular water supply or faucet to calculate the actual water volume being consumed or consumed during a water consuming activity.

A calibrated vessel, such as a disposable plastic bucket 202 that can temporarily attach or be supported by the shower head 204 or be placed into the tub, lavatory or sink, may show graduated increments 208 of the reference water volume so that the user may easily monitor the filling rate and assess the reference volume within the vessel. The time required to fill the reference volume may be entered into the device, such as by using the keys/buttons and/or input switches, to provide the flow constant for the particular supply or faucet in order to generate a volumetric consumption calculation. The user may use the device in stop watch mode to obtain this constant, actuating the START key 210 as the water is turned on to fill the reference vessel and the STOP key when the water is turned off after the filling is complete to a reference volume. The display on the device 212 may indicate the elapsed time for filling with the reference volume of water. Alternatively, any timing means may be used to time the filling of the calibration vessel and the time measured may be entered into the device using a selector switch.

Figure 3:
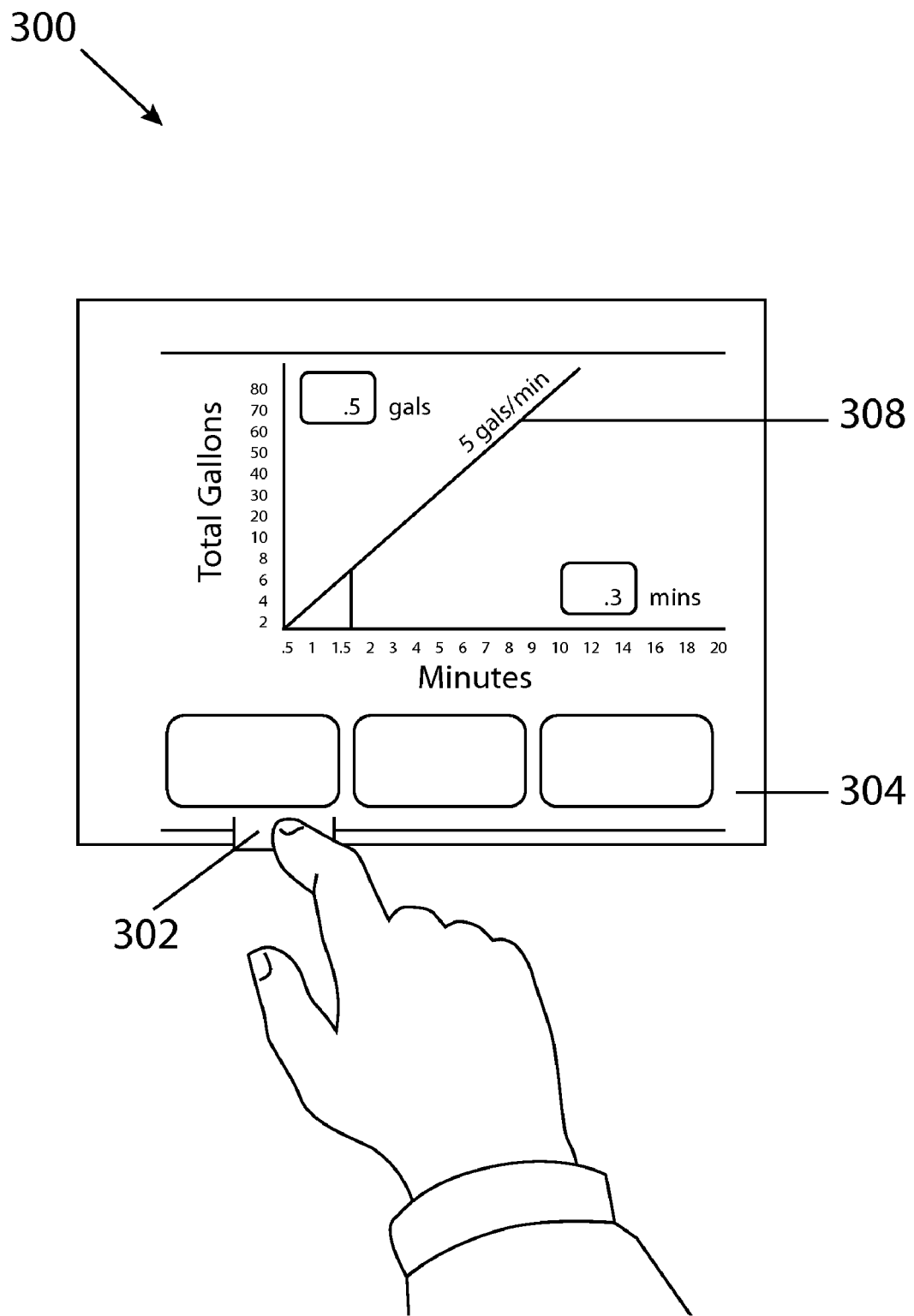
FIG. 3 is a perspective view illustrating the device shown in FIGS. 1A and 1B and a method of calibrating or setting the device for use.

Referring to FIG. 3, the elapsed time for filling of the reference volume is set on the device by a selector switch 302 with a time scale 304 which can be of many types, i.e., slider (illustrated), rotary, dip switch, etc. and thereafter may provide the computational constant that the device may use to calculate the amount of water consumed during the timed interval. Alternatively, calibration may be done automatically using a CALIBRATION key on the device. In calibration mode, the actuation of the START key as filling of a calibration vessel commences and the actuation of the STOP key when the calibration volume is complete may automatically enter the flow rate into the device memory. The calculation of consumption rate supplied from that particular supply or faucet, or the computational constant, may be displayed as a trend line 308, a bar graph, a scatter plot, or the like on the display, relating time in hours, minutes, seconds, or the like on the x-axis to amount of water consumed (in units that may be selectable by the user) on the y-axis. In an alternative embodiment, time is displayed on the y-axis while amount of water consumed is displayed on the x-axis.

In an embodiment, the device may be acoustically triggered. The device may have an audio recognition system which may recognize the acoustic signature of the running faucet, water supply, shower, or the like. If the audio recognition system recognizes the acoustic signature of running water, the device may automatically commence timing the consumption of water. Once the device no longer acoustically detects running water, the device may automatically terminate timing consumption. In an embodiment, a user may switch the device between audio recognition mode and manual mode. In an embodiment, even if the device is in audio recognition mode, the START and STOP keys may still be used to commence or terminate timing.

Figure 4:
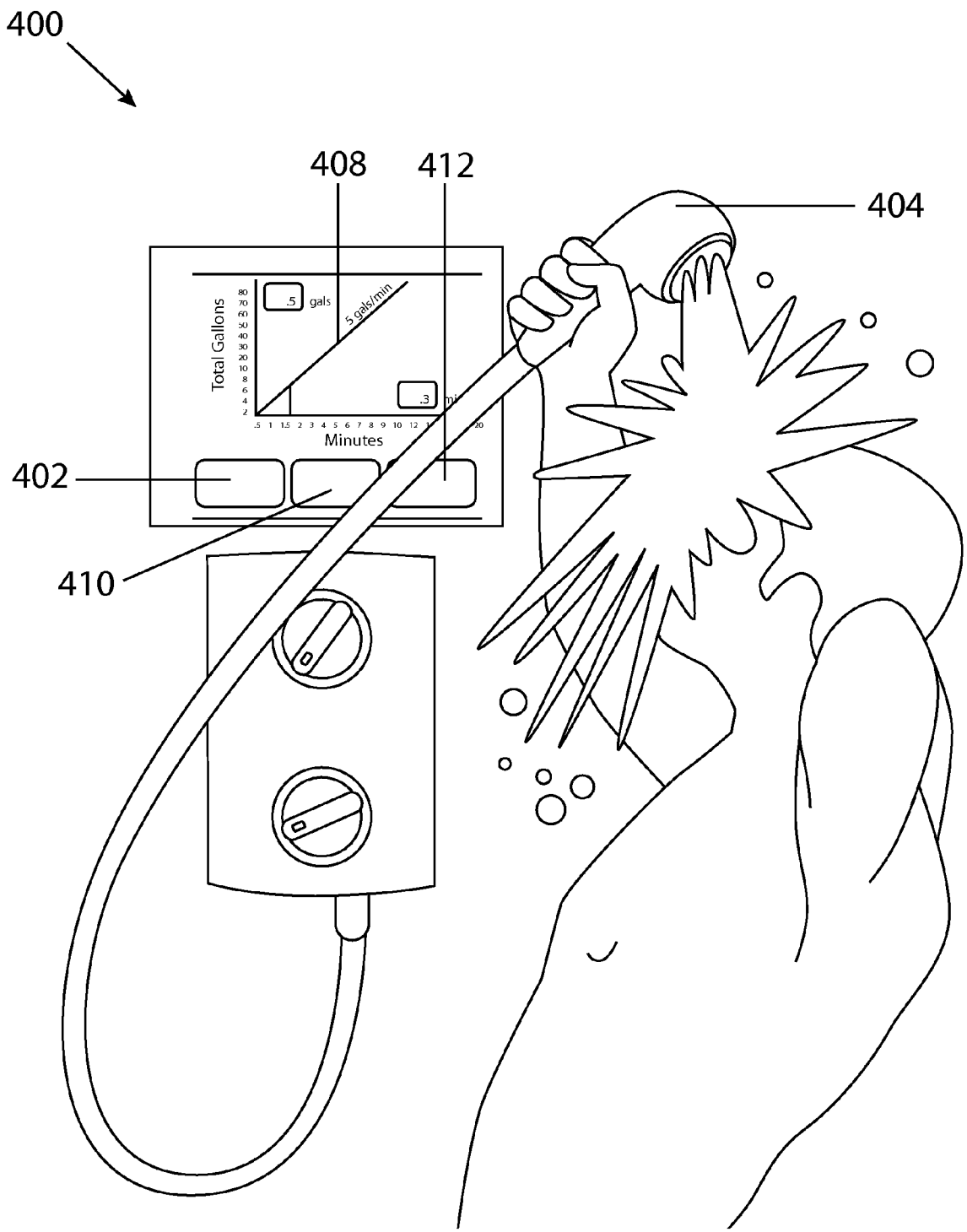
FIG. 4 is a perspective view of one installation and utilization of the device shown in FIGS. 1A and 1B.

Referring to FIG. 4, in operation, the device may monitor, for example, daily usage of water for a particular water-consuming activity, such as showering. During normal usage of water consumption monitoring, the user may push the START key 402 as she or he commences water use, such as showering 404, washing dishes, washing their hands, watering the lawn, doing the laundry, and the like. The device may increment the elapsed time continuously during water usage and calculate the volumetric water consumption. Elapsed time may be displayed on the device time in minutes and seconds, or any other time increment, and the water consumed in gallons, or any other volumetric increment. The device may simultaneously display a graphic representation of area under the flow rate reference line 408 to further graphically represent the flow rate and the volume of water being consumed. When water use is complete the user may press the STOP key 410 and the device may stop calculation, displaying the total elapsed time and total volume of water usage. Alternatively, if the device possesses audio recognition capability, the device may automatically commence timing when water use, such as showering 404, washing dishes, washing their hands, watering the lawn, doing the laundry, and the like, commences. When water use is complete the device may automatically stop calculation, displaying the total time and water usage. In any event, the RESET key 412 may erase the information and zero the device so that it is ready for the next interval of water usage computation. In embodiments, the device may store the collected water usage information in a device memory and display the aggregate usage and show water consumption trends.

In an embodiment, the device may include an energy savings calculator. The calculator may display potential water, energy and/or cost savings if the flow rate or water consumption were adjusted. For example, the device may have a water cost input. The cost of the water consumed may be calculated by the device after the consumption has been calculated by multiplying the total consumption by the cost of water per volume. The device may come pre-loaded with a standard water cost, which may be modified by the user using the water cost input to reflect local water delivery costs. The water cost input may be a slider, a rotary dial, a dip switch, a button, and the like. In an embodiment, the device may include a thermometer for measuring the temperature of the water or a temperature input. In an embodiment, the thermometer may be integrated. The device may be placed under the running water to measure the temperature. In embodiments, the device includes a temperature input into which an exogenously measured temperature may be entered. In any event, the energy savings calculator may use a temperature reading to calculate and display potential energy and/or cost savings if the temperature of the water were adjusted. The cost of energy delivery may be pre-loaded onto the device upon purchase and may be modified by a user to reflect local energy delivery costs.

In an embodiment, the device may include an alarm to alert the user of a water consumption threshold. For example, the device may come pre-loaded with a water-efficient consumption volume for a water consumption activity, such as a water consumption volume for a water-efficient shower. This volume may be modified by a user of the device. The alarm, which may be visual or audible, may be triggered when the calculated consumption approaches or reaches the pre-set consumption volume.

In an embodiment, the device may comprise an integrated AM/FM or satellite radio, an integrated CD player, an integrated MP3 player, a mirror, a hook, a soap dish, a device holder, a dispenser such as for shampoo, laundry detergent, fertilizer, and the like, a thermometer, a clock, and the like.

In an embodiment, the device may comprise additional functions whereby the memory of the device may collect, compile and store water consumption information for a particular water supply or faucet for water-consuming activities over a period of time. The device may store and display such information at the display as the aggregate of water usage and/or as general trends of water consumption.

In an embodiment, the device may be configured to program into memory a total time required and/or desired for a water-consuming activity whereby the timer or real-time clock may count the time elapsing during a water-consuming activity and, upon reaching the programmed total time, the device may sound an audible alarm, indicating the total required/desired time has elapsed. The alarm may be terminated manually or may only terminate when the water flow is stopped. If the water is turned back on immediately, the alarm may re-start. The interval between when the water may be re-started without triggering the alarm after terminating a previous water usage may be set by the user. Thus, users are forced to terminate the water usage at the pre-programmed interval. Similarly, the total required and/or desired water consumption of a water-consuming activity may be entered into memory whereby the device determines the volume of water consumed based upon the computational constant and, when the programmed volume of water has been used, the device initiates an audible or visual alarm, indicating the total required/desired volume of water has been consumed. In addition, the device may be configured to provide both options described above. Further, the device may be programmed to provide an audible warning alarm to indicate the total programmed time of a water-consuming activity will soon expire, e.g., within 30 seconds, and/or the total volume of water will be consumed, e.g., within one minute, in order for the device to provide a warning to a user such that the user can finish up the activity.

In an embodiment, the device may be used to provide water consumption credits for application to future water-consuming activities. Such credits may be applied in the context described above whereby the device may collect, compile and store water consumption information for a particular water supply or faucet for water-consuming activities over a period of time. The device may store such information according to each water-consuming activity and may calculate if more or less water was consumed during such activities relative to a programmed value of required/desired water consumption. The device may thereby track any water consumption credits that are available from previous water-consuming activities and may display such credits to a user upon actuation of one or more of the keys/buttons the input switches and/or by selecting a credit mode of the device. The device may apply any or all stored credits to the calculation of the volume of water usage for one or more future water-consuming activities. Application of such credits may be applied by the device upon selection of the credit mode of operation. In addition, the device may similarly track any water consumption debts that are owed from previous water-consuming activities and may display such information at the display to motivate users to conserve water during future water-consuming activities.

What is claimed is:

1. A method of calculating an attribute of water usage, comprising:
   determining, via a flow timer of a water usage meter, a flow rate of a household faucet as an interval of time over which an amount of water is consumed;
   measuring, via an electronic clock of the water usage meter, a water consumption time interval during a water consuming activity at the household faucet;
   calculating, via a central processing unit (CPU) of the water usage meter, a volume of water consumed using the flow rate and the water consumption time interval; and
   calculating, at the CPU, potential water savings for a future water consuming activity if at least one of the flow rate and the water consumption time interval were to be adjusted.

2. The method of claim 1, wherein determining the flow rate comprises actuating a start button of the water usage meter to commence timing and a stop button to terminate timing.

3. The method of claim 1, further comprising automatically starting and stopping the timer when the acoustic signature of running water is detected by an audio recognition system of the water usage meter.

4. The method of claim 1, wherein the amount of water consumed, a water temperature and an energy delivery cost are used to calculate, at the CPU, potential cost savings if at least one of the water temperature and water consumption were to be adjusted.

5. The method of claim 1, wherein the amount of water consumed and a water delivery cost are used to calculate, at the CPU, potential cost savings if the water consumption were to be adjusted.

6. A water usage meter, comprising:
   a measurement system to measure a flow rate of a household faucet as an interval of time over which a defined amount of water is consumed;
   a timer to measure a water consumption time interval during a water consuming activity at the household faucet; and
   a calculator to calculate a volume of water consumed using the flow rate, the water consumption interval, and a potential water savings for a future water consuming activity if at least one of the flow rate and the water consumption time interval were to be adjusted.

7. The meter of claim 6, further comprising a start button of the measurement system to commence timing and a stop button to terminate timing.

8. The meter of claim 6, further comprising an audio recognition system for automatically starting and stopping the timer when the acoustic signature of running water is detected.

9. The meter of claim 6, wherein the calculator uses the amount of water consumed, a water temperature and an energy delivery cost to calculate potential cost savings if at least one of the water temperature and water consumption were to be adjusted.

10. The meter of claim 6, wherein the calculator uses the amount of water consumed and a water delivery cost to calculate potential cost savings if the water consumption were to be adjusted.

11. A method of conserving water during a water consuming activity monitored by a water usage meter, comprising:
   collecting, at a central processing unit (CPU) of a water usage meter, water consumption information for a particular water supply over a period of time;
   calculating, at the CPU, whether more or less water was consumed during the water consuming activity relative to a programmed value of water consumption;
   calculating, at the CPU, and storing, in a memory coupled to the CPU, a water consumption credit if less water was consumed than a programmed value, or calculating, at the CPU, and storing, in the memory coupled to the CPU, a water consumption debit if more water was consumed than a programmed value; and
   applying, via a calculation at the CPU, the water consumption credit or debit to the calculation of a volume of water allocated for one or more future water-consuming activities.

12. The method of claim 11, wherein the water consuming activity is automatically terminated by the water usage meter when the allocated volume of water usage is reached.

* * * * *